US005937983A

United States Patent [19]

Martin et al.

[11] Patent Number: 5,937,983

[45] Date of Patent: Aug. 17, 1999

[54] FLUID FRICTION CLUTCH

[75] Inventors: Hans Martin, Stuttgart; Franz A. Bierbrauer, Schwalbach, both of Germany

[73] Assignee: Magenta GmbH Systemlieferant fuer Elektromagnetische Baugruppen, Heusweiler, Germany

[21] Appl. No.: 08/955,995

[22] Filed: Oct. 22, 1997

[30] Foreign Application Priority Data

Nov. 5, 1996 [DE] Germany .......................... 196 45 478

[51] Int. Cl.[6] .................................................... F16D 35/02

[52] U.S. Cl. ...................................... 192/58.61; 192/58.8

[58] Field of Search ............................... 192/58.61, 58.8, 192/84.31; 251/129.16

[56] References Cited

U.S. PATENT DOCUMENTS

| | | | |
|---|---|---|---|
| 4,056,178 | 11/1977 | Detty | 192/58.61 |
| 4,270,641 | 6/1981 | Nonnemann et al. | 192/82 T |
| 4,271,945 | 6/1981 | Budinski | 192/58.61 |
| 4,302,156 | 11/1981 | LaFlame | 416/169 A |
| 4,305,491 | 12/1981 | Rohrer | 192/58.61 |
| 4,310,085 | 1/1982 | LaFlame | 192/58.61 |
| 4,355,709 | 10/1982 | Light | 192/58.61 |
| 4,650,045 | 3/1987 | Weible et al. | 192/58.61 |
| 4,893,703 | 1/1990 | Kennedy et al. | 192/58.61 |
| 5,025,906 | 6/1991 | O'Neil et al. | 192/58.61 |
| 5,101,949 | 4/1992 | Takakawa et al. | 192/58.61 |
| 5,511,643 | 4/1996 | Brown | 192/58.61 |
| 5,555,963 | 9/1996 | Martin | 192/58.61 |

FOREIGN PATENT DOCUMENTS

| | | |
|---|---|---|
| 27 18 723 | 11/1977 | Germany . |
| 28 04 859 | 8/1979 | Germany . |
| 29 20 187 | 12/1979 | Germany . |
| 31 09 724 | 2/1982 | Germany . |
| 32 43 967 | 5/1984 | Germany . |
| 33 33 268 | 4/1985 | Germany . |
| 36 25 976 | 2/1988 | Germany . |
| 89 08 357 U | 12/1989 | Germany . |
| 40 13 216 | 11/1990 | Germany . |
| 43 44 085 | 6/1995 | Germany . |

OTHER PUBLICATIONS

Martin, "Elektronisch geregelte elektromagnetische Visco–Lüfterkupplungen Für Nutzfahrzeuge", ATZ Austomobilechnische Zeitschrift 95, May 1993, pp. 240–247.

*Primary Examiner*—Richard M. Lorence
*Attorney, Agent, or Firm*—Foley & Lardner

[57] ABSTRACT

A fluid friction clutch has a supply chamber separated from a working chamber by a connecting orifice between the supply chamber and the working chamber. The clutch has a pivotable valve lever with a permanent magnet. A circuit applies a selectively positive or negative current to an electromagnetic coil for generating a selectively alternative magnetic field that interacts with the permanent magnet to control the movement of the valve lever, and, thereby open and close the connecting orifice.

15 Claims, 3 Drawing Sheets

6
22
9
4
3
15'
1
8
13
12
18
2'
17
14
11
5
19
12'
6
20

6
4
22
5
10
16
15
8
2a
13
12
10
11
17
2
1
14
3
9
18

6
22
9
4
1
3
15'
8
13
18
12
17
2'
11
5
19
14
12'
6
20

6
9
22
5
3
21
1
13
15''
12
18
2(2')
12'
7
6

8
22
15''
34
31
30
21
10
13
12
12'
11
32
33
9
39
35

7
6
22
3
12
5
2
2a
12
13
15'''
9
18
11

FLUID FRICTION CLUTCH

BACKGROUND OF THE INVENTION

The invention relates generally to a fluid friction clutch. More particularly, it relates to a fluid friction clutch having a housing with a supply chamber separated from a working chamber and with a connecting orifice in a partition between the coaxially arranged chambers, the partition capable of being opened or closed by a pivotable valve lever that is provided with a permanent magnet and stops that limit the deflection of the latter and which can be controlled via an electromagnetic coil.

German Published Application 28 04 859 discloses such a fluid friction clutch. In the disclosed clutch, an electromagnetic coil is held rotatably fixed by a ball bearing which is arranged in the cover of the clutch in front of the supply chamber. The valve lever is mounted in the supply chamber, the valve lever being provided, opposite the coil, with a permanent magnet and the valve lever is mounted on a pivot axis on the partition between the supply chamber and working chamber, the pivot axis being located close to the permanent magnet. The valve lever is loaded in the direction of the electromagnetic coil by a spring which is supported on the partition. The passage orifice in the partition is located in the outer region of the supply chamber, where, as a consequence of the rotation of the clutch housing, the clutch fluid can enter the working chamber when the valve lever is opened. In the known clutch, such as the one described above, the adjusting forces exerted by the coil, to counter the spring effect and which act on the short lever arm present between the permanent magnet and pivot axis, are relatively high. Moreover, with the arrangement of a compression spring, the adjusting forces required may change with increasing age, and, therefore, the clutch does not function satisfactorily over time.

German Published Application 27 18 723 also discloses a fluid friction clutch, in which the inflow and outflow of the working fluid are controlled by applying current to a coil. An armature arranged with a sliding fit in the partition is arranged, coaxially relative to the drive shaft of the clutch, to a valve arm. The valve arm, by means of the armature subjected to the magnetic field of the coil, can be moved axially relative to the partition between the working chamber and supply chamber, the partition being provided in its outer region with a throughflow orifice. In this clutch, the armature is held by a spring in an initial position in which the passage orifice in the partition is open. The magnetic field which is generated by the coil, and which moreover, acts via the shaft and the housing of the clutch, must therefore be relatively high. Since a return spring is also provided, the previously described disadvantages of using a spring also apply.

SUMMARY OF THE INVENTION

One of the objects of the present invention is to provide a fluid friction clutch similar to that described above, in which the use of a return spring is unnecessary.

Another object of the invention is to provide a fluid friction clutch that uses a selectively positive or negative current for generating a selectively alternative magnetic field, and thereby control a pivotable lever to open and close the connecting orifice between the working and supply chambers of the clutch.

A further object of the invention is to provide a fluid friction clutch that uses a first and a second permanent magnet to position the valve lever arm in a first position with respect to the connecting orifice and uses an electromagnetic coil to move the valve lever from the first position to a second position with respect to the connecting orifice.

These and other objects are achieved by providing a fluid friction clutch having a supply chamber separated from a working chamber by a connecting orifice. The clutch has a pivotable valve lever connected to a permanent magnet that opens and closes the connecting orifice. A circuit applies selectively positive or negative current to an electromagnetic coil to control the pivotable valve lever and, thereby, open and close the connecting orifice.

In another embodiment, a second magnet is provided that pivots the valve lever to a first position that either opens or closes the connecting orifice between the supply and working chambers. A current applied to the electromagnetic coil pivots the valve lever to corresponding second position that either closes an open connecting orifice or vice versa.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
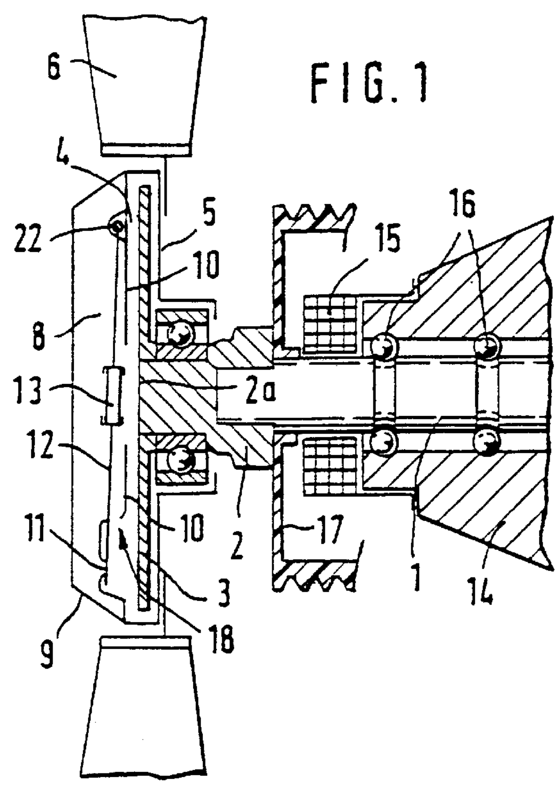
FIG. 1 shows a first embodiment of a fluid friction clutch in a position with a closed inflow orifice in the partition between a supply chamber and working chamber.

A fluid friction clutch of the type described above, achieves one or more of the above described objects, in a first embodiment, by providing a circuit for applying positive or negative current to the electromagnetic coil for generating a selectively alternating magnetic field, by means of which the valve lever can be moved out of the closed position into the open position and vice versa. A return spring which triggers the lever movement in one direction thereby becomes unnecessary.

A second embodiment, provides a first permanent magnet arranged proximate to a second permanent magnet, fixed to the housing, or a magnetically active region at such a distance that the forces exerted on the first permanent magnet move the valve lever into one of its end positions—a first position. The electromagnetic coil provided being capable of having current applied to it in such a way that the valve lever can be moved into the other end position—a second position.

As a result of the invention, in both embodiments, the control of the valve lever is achieved solely by the use of magnetic fields. The arrangement of any return springs or their relatively complicated assembly becomes unnecessary. It is sufficient to ensure, in each case, that there are magnetic fields which move the valve lever equipped with the permanent magnet either in one direction or the other. For this purpose, with an appropriate arrangement, relatively low magnetic forces can ensure the necessary field change. High forces do not have to be exerted. In this case, the valve lever is preferably produced, for example, from plastic, so that it does not influence the magnetic field.

Another aspect of the invention, provides for the pivot axis of the valve lever to be as far away from the first permanent magnet as possible. The valve lever arm, via which the magnetic forces take effect, thereby becomes very long, and both the magnetic forces to be exerted by the permanent magnet itself and those which are to be generated by the coil can be kept relatively low. This, in turn, allows the use of small electromagnetic coils.

In an preferred embodiment of the invention, the first permanent magnet may be arranged in the middle of the valve lever and the pivot axis of the valve lever may be arranged at one end of the lever. It is thereby possible to obtain a long distance between the permanent magnet and pivot axis, whilst ensuring an convenient design.

Moreover, it is possible, in a conventionally known way, for the electromagnetic coil to be not only assigned to various points of the clutch, but also, for example, to a vehicle engine radiator mounted in front of the clutch. This arrangement is often used when a fan driven by the fluid friction clutch is used to operate a fan for engine cooling.

In another aspect of the invention, however, a particularly preferred embodiment may be one in which the supply chamber is closed in a completely sealed manner by its cover and all the coil parts or mountings for these are fastened outside the cover on a recess provided in the cover. This can be carried out by means of a central screw, so that simple mounting and demounting of the coil arrangement, including the current connections, become possible.

Figure 2:
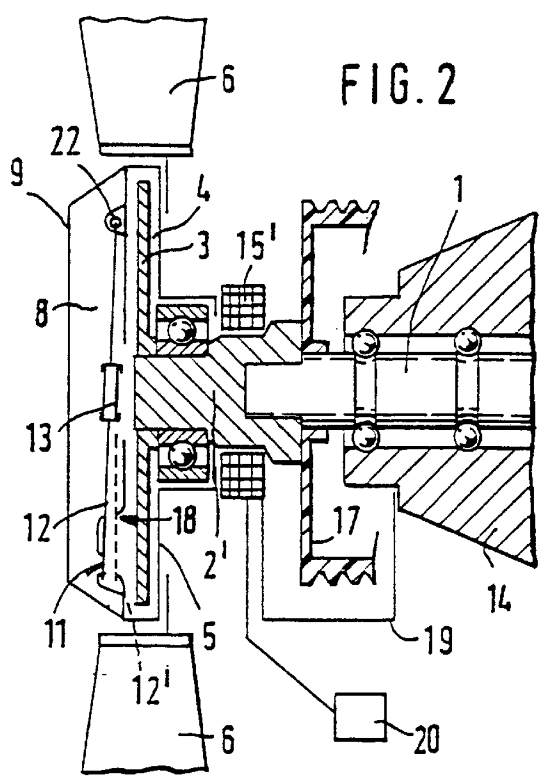
FIG. 2 shows a variant of the embodiment according to FIG. 1, likewise with a closed inflow orifice.
Figure 3:
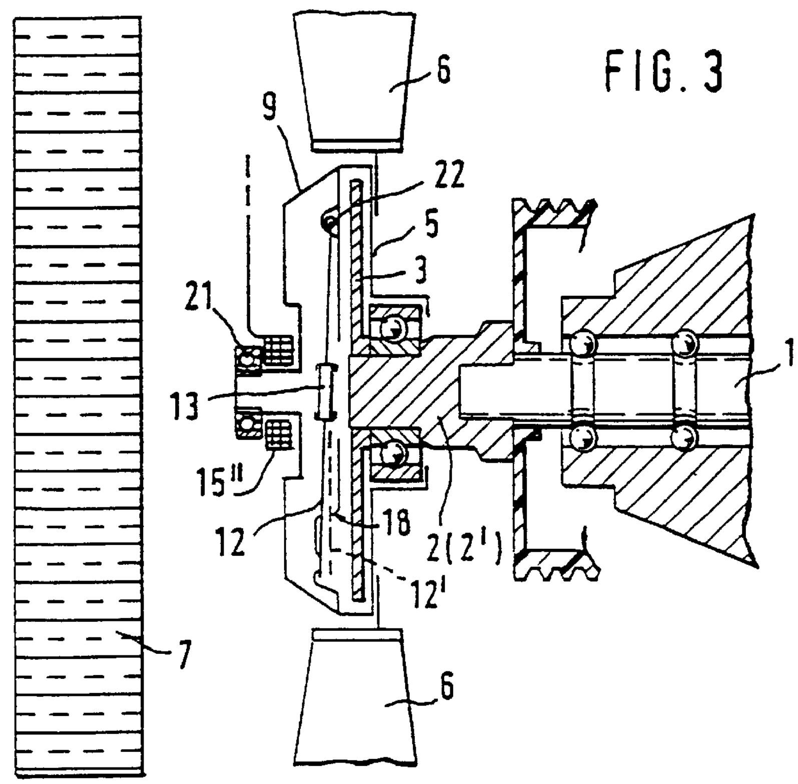
FIG. 3 shows a another embodiment of a fluid friction clutch, in which the electromagnetic coil is mounted on the clutch housing cover adjacent to a radiator.
Figure 4:
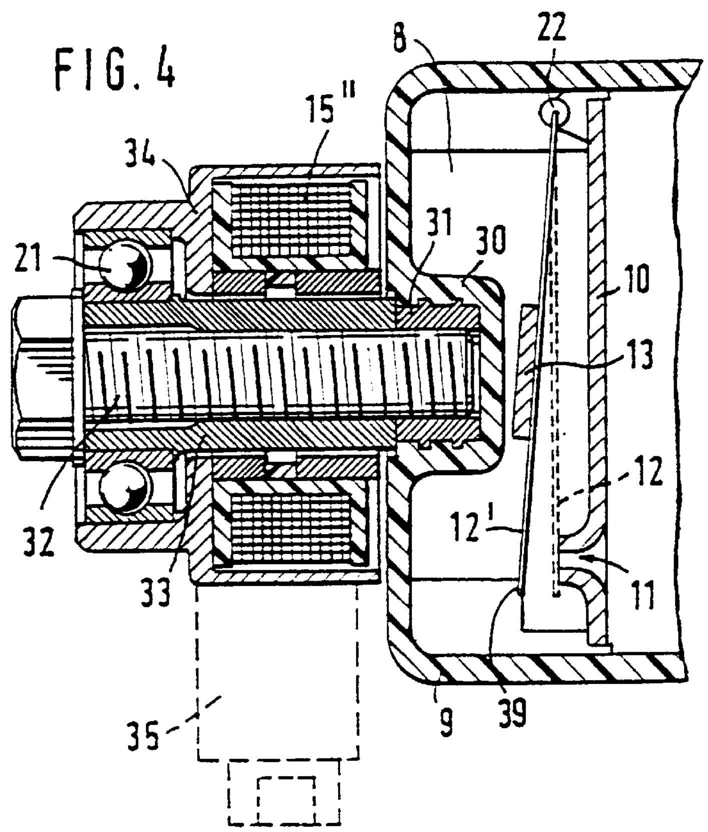
FIG. 4 shows a practical construction of the embodiment shown in FIG. 3.

Referring now to the figures, FIGS. 1–4 show a fluid friction clutch of similar design, which includes a shaft 1 and a drive flange 2 slipped on to the shaft 1 and connected to a drive disk 3. The drive disk 3 is arranged within a working chamber 4 which is part of a housing 5 mounted rotatably on the drive flange 2 and which is equipped with the blades 6 of a fan serving for cooling the coolant for a vehicle engine (not shown), the radiator 7 of which is shown in FIGS. 3 and 4.

The working chamber 4 within the clutch housing 5 is arranged coaxially relative to a supply chamber 8 which is arranged in a cover 9 of the clutch housing 5. A partition 10 runs within the clutch housing between the working chamber 4 and the supply chamber 8 and is provided with a connecting orifice 11 between the supply chamber 8 and working chamber 4. As shown in FIG. 1, and also in FIGS. 2 to 4, this orifice 11 is closed by a valve lever 12 which is provided at its middle with a permanent magnet 13. The permanent magnet 13 may also be arranged eccentrically, such as, for example, it may be mounted toward a free end of the valve lever 12.

Connected to the mounting 14 for the shaft 1 is an electromagnetic coil 15 which, like the ball bearing 16, is covered relative to the clutch housing 5 by a belt pulley 17 composed of a non-magnetizable material, so as not to screen the magnetic field.

Figure 5:
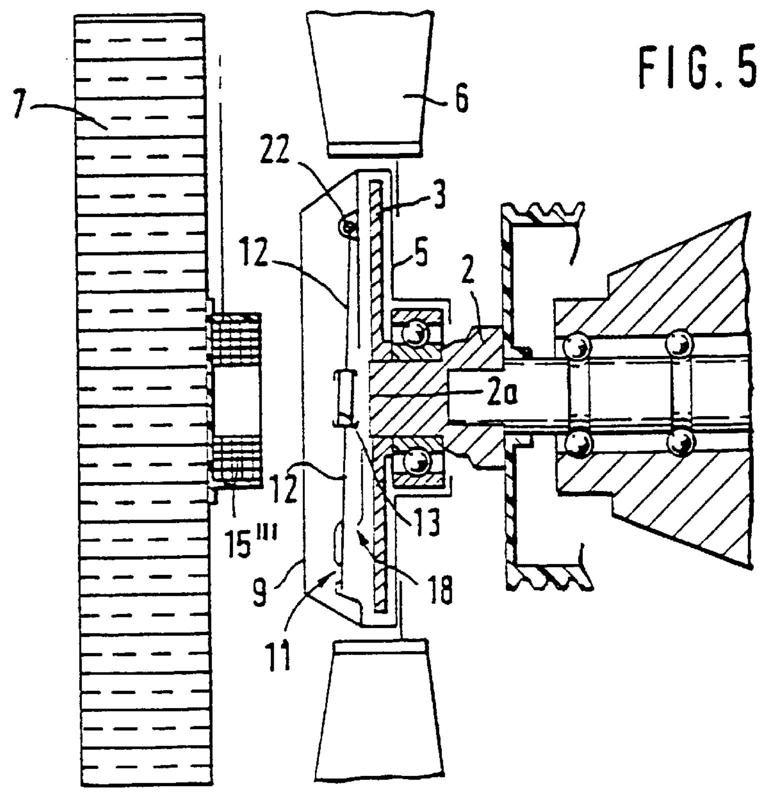
FIG. 5 shows another embodiment similar to that shown in FIG. 3, but with an electromagnetic coil arranged directly on the radiator.

In the position shown in FIG. 1, and also in FIGS. 2, 3 and 5, current is applied to the coil 15. This brings about in a conventional way, via the shaft 1 and, if the connecting flange 2 is composed of magnetizable material, via the clutch itself, the buildup of a magnetic field. The permanent magnet 13 is repelled by this magnetic field from the middle part of the connecting flange 2 located opposite the permanent magnet 13, the valve lever 12 thereby being brought into the position shown. When the application of current to coil 15 is interrupted, the magnetic field of the permanent magnet 13 takes effect, so that the permanent magnet 13 is attracted towards the middle part of the connecting flange 2 composed of magnetizable material. The lever 12 is therefore pivoted counterclockwise, until it comes into a second end position, in which it bears on the stop 18 which is likewise designed on the partition 10. In this position, the orifice 11 is open.

The fluid friction clutch illustrated in FIG. 1 therefore has a so-called failsafe behavior. In the event of a current failure, the connection between the supply chamber 8 and the working chamber 4 is open. The clutch is therefore fully engaged and the fan is in operation.

Another embodiment is provided in FIG. 2, in which the connecting flange 2' for the clutch disk 3 is composed of a non-magnetizable material, such as, aluminum or a similar material. In this embodiment, the electromagnetic coil 15' is arranged on a region of the connecting flange 2', but is firmly connected to the fixed mounting 14 via a retention means 19. Moreover, the electromagnetic coil 15' is connected to a control device 20 which selectively causes a positive or negative current to be applied to the coil 15'. The magnetic field generated by the coil 15' therefore changes its polarity and can be utilized both to hold the valve lever 12 in the position illustrated according to FIG. 2, in which the inflow orifice 11 is closed, and also to move the valve lever 12 into a second position 12', represented by broken lines, in which the orifice 11 is open.

Therefore, whereas, in the embodiment shown in FIG. 1, it is important to place the permanent magnet 13 at such a distance from the middle surface 2*a* of the connecting flange 2 that the magnetic forces exerted by the permanent magnet 13 are sufficient to cause the valve lever 12 to pivot counterclockwise, such an arrangement is not necessary in the embodiment shown in FIG. 2. The embodiment shown in FIG. 2 only requires that the permanent magnet 13 be located in the range of influence of the alternatingly acting electromagnetic field generated by the coil 15', in order to cause the valve lever 12 to pivot to its two end positions.

The embodiment of FIG. 3 likewise allows a design similar either to FIG. 1 with a connecting flange 2 composed of magnetizable material or a design similar to FIG. 2 with a connecting flange 2' composed of non-magnetizable material. The electromagnetic coil 15" arranged on the cover 9 via a bearing 21 makes it possible to influence the permanent magnet 13 via a magnetic field having alternating polarity, but also via a magnetic field which acts only on one side and holds the valve lever 12 in the position represented by unbroken lines and which serves for closing off the connecting orifice 11 between the supply chamber 8 and working chamber 4. In the second embodiment, however, the design must be such that the magnetic forces of the permanent magnet 13 are sufficient for pivoting the valve lever into the position 12'.

FIG. 4 shows a practical embodiment of part of the fluid friction clutch shown diagrammatically in FIG. 3, with the like reference symbols referring to like parts. Clutch cover 9 is completely closed relative to the outside, but is provided coaxially relative to the drive shaft 1 (not shown), with a pot-like recess 30 which is accessible from outside and into which a threaded bush 31 is inserted and fixed. This may be achieved, for example, by producing the threaded bush 31 with outward-projecting rings, in one piece with the plastic cover 9 of the fluid friction clutch.

Screwed into this threaded bush 31 is a mounting for the electromagnetic coil including a central fastening screw 32 which holds a sleeve 33 made of magnetizable material fixed on the cover 9 of the fluid friction clutch. The bearing 21 for the mounting of a coil retention means 34, and of the coil 15" seated thereon, are arranged on the sleeve 33.

The threaded bush 31 inserted into the cover 9 is also composed of magnetizable material. It serves as an opposite pole of the permanent magnet 13 when no current is applied to the coil 15", the arrangement being such that the permanent magnet 13 is attracted by the magnetizable material of the threaded bush 31, so that the valve lever 12, as shown in FIG. 3, assumes its position 12', represented by unbroken lines, in which the orifice 11 in the partition 10 is opened.

By contrast, when current is applied to the coil 15", a magnetic field forms around the sleeve 33 and the threaded bush 31, such that the permanent magnet 13 is repelled and the valve lever 12 is moved into the closed position which, as shown in FIG. 4, is different from that shown in FIG. 3 because the orifice 11 is arranged on the right-hand side of the valve lever 12.

One of the advantages of the embodiment according to FIG. 4 is that the clutch housing, shown in the figure by its cover 9, is completely closed relative to the outside, so that the electromagnetic arrangement can be mounted on the clutch or demounted from it simply by unscrewing and screwing on the screw 32. This embodiment also provides the retention means 34 for the coil 15" with a plug 35, so that the current connection of the coil retention means 34, held non-rotatably in front of the fluid friction clutch, also does not present any difficulties. A replacement or exchange of the coil arrangement is greatly facilitated by this design. It can also be seen in FIG. 4 that, when current is not applied to the coil 15", the valve lever 12 is held in the position 12' due to the fact that it bears with its end facing away from the pivot axis 22 against a stop 39 which is arranged within the supply chamber 8 and which corresponds to the stop 18 shown in FIGS. 1–3 and 5.

As may be inferred from FIGS. 1 to 4, the valve lever 12, which carries the permanent magnet 13 in the middle of lever 12, is mounted at its outermost end pivotably about a pivot axis 22 which is, therefore, at the maximum possible distance from the permanent magnet 13 arranged centrally on the lever 12. Between the pivot axis 22 and the point of engagement of the magnetic forces on the permanent magnet 13 there is, therefore, a very long lever arm which makes the adjusting forces for pivoting the valve lever 12 relatively low. As a result, at least in the case of the embodiment of FIG. 3 and 4, in which the coil 15" is located very near to the permanent magnet 13, the coil can be designed to be relatively low-power and, therefore, small.

As shown in FIG. 5, the electromagnetic coil 15''' is seated on the radiator 7 which is mounted directly in front of the fan formed by the blades 6 and by the housing 5. Here too, the valve lever 12 can be held in the position shown, in which the orifice 11 is closed, by applying current to the coil 15'''. When current is no longer applied to the coil 15''', the permanent magnet 13 is attracted against the surface 2*a* if, for example, a second permanent magnet is arranged at this point or if at least this part of the connecting flange 2 is composed of a magnetizable material.

Figure 6:
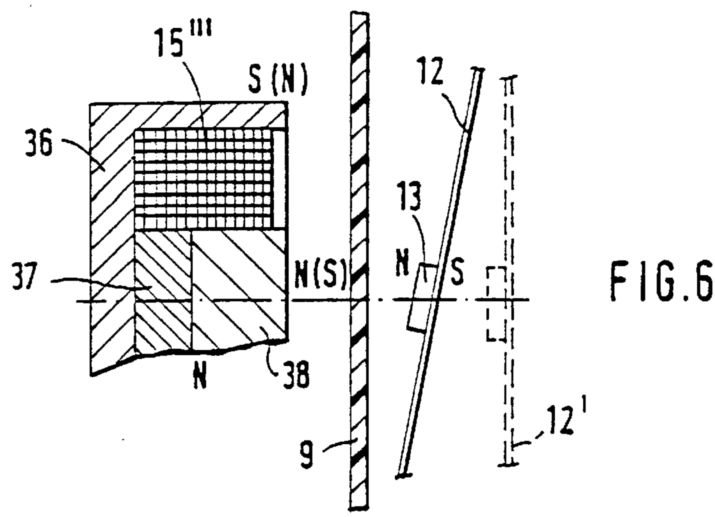
FIG. 6 shows a variation of the embodiment shown in FIG. 5.

FIG. 6 reveals that the electromagnetic coil 15''' placed in front of the radiator 7, shown in FIG. 5. The coil 15''' is surrounded by a retention means 36 produced from magnetizable material and is provided with a core 37 which is likewise composed of magnetizable material. A second permanent magnet 38 is mounted in front of this core 37 in the direction of the clutch cover 9, the second permanent magnet 38 being polarized in such a way that its magnetic field repels the permanent magnet 13 on the valve lever 12 when no current is applied to the coil arrangement 15'''. The valve lever 12 therefore assumes the position 12', represented by broken lines, in which the orifice 11 (not shown) is open.

When current is applied to the coil arrangement 15''' the polarity of the second permanent magnet 38 is reversed (as indicated by the designations N and S placed in parentheses). The permanent magnet 13 is attracted and the valve lever 12 is in the position shown, in which the orifice 11 is closed, as shown also in FIG. 5.

It is, therefore, clear that the embodiments of FIGS. 1, 3 and 5, in which the connecting flange 2 is either composed entirely of magnetizable material or is provided, at least on its surface 2*a*, with a permanent magnet or with a magnetically active part, are of the failsafe type. In the event of a current failure, in all these embodiments, the inflow orifice 11 is open and the fan is in operation.

In the embodiment shown in FIG. 2, a failsafe behavior, can also be achieved via magnetic forces of the permanent magnet 13, by virtue of the fact that the pivoting lever 12, suspended on the pivot axis 22 in the radially outer region of the rotatable clutch housing 5, is moved into the open position 12' by means of the centrifugal forces occurring during the rotation of the housing 5. The embodiment of FIG. 2 can thereby also acquire a failsafe design.

Figure 7:
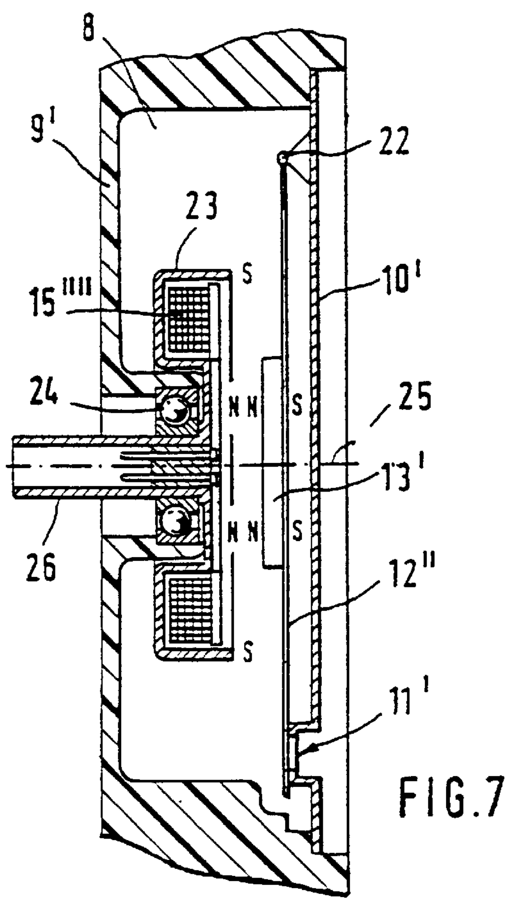
FIG. 7 shows an embodiment of a housing cover for an electromagnetic clutch according to the invention in an applied-current position with the inflow orifice closed, the electromagnetic coil being integrated into the housing cover.
Figure 8:
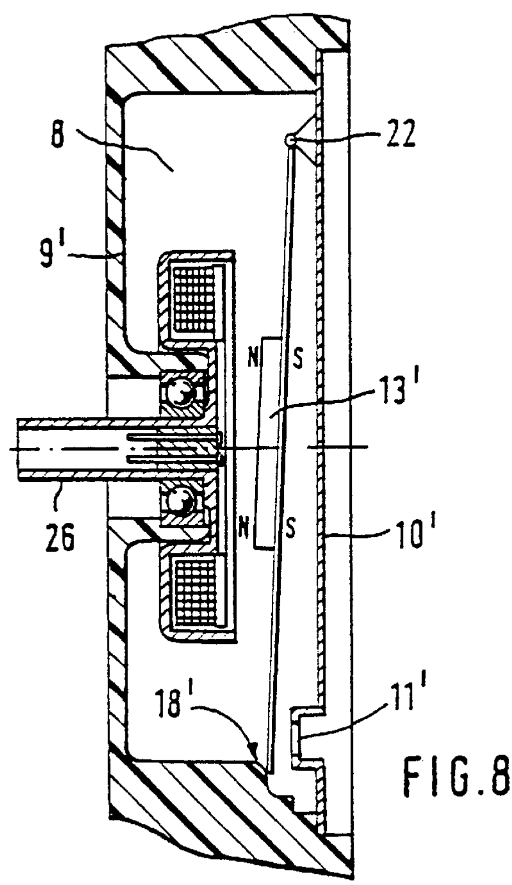
FIG. 8 shows the housing cover shown in FIG. 7 in a currentless state of the electromagnetic coil, in which state the inflow orifice is open.

FIGS. 7 and 8 show an embodiment in which the electromagnetic coil 15"" is arranged in a retention means 23 mounted fixedly within the cover 9' of the clutch housing, which is otherwise not shown. For this purpose, a roller or rolling bearing 24, in which the retention means 23 is held firmly, is inserted coaxially into the cover 9'. The retention means 23 includes, in the region of the axis of rotation 25, a tubular piece 26, through which the electrical connections for the coil 15"" can be led. In a similar way to the embodiments of FIGS. 1–5, the valve lever 12" is assigned a permanent magnet 13', which, when current is not applied to the coil, is attracted toward the retention means 23 composed of magnetizable material and, consequently, exposes the orifice 11' in the partition 10' between the supply chamber 8 and the working chamber (not shown).

In this embodiment, the coil 15"" can be controlled via a circuit 20 in a way similar to FIG. 2, if the retention means 23 is to be composed of non-magnetizable material or there are other reasons for carrying out the control by the alternating application of a magnetic field. In this case, however, the clutch would not be of the failsafe type. Therefore, the design according to FIGS. 7 and 8 will preferably provide for the production of the retention means 23 from magnetizable material or the arrangement of at least a magnetically active surface in the region of the inner end of the tube 26, so that, in the event of a current failure, the open position shown in FIG. 8 is achieved.

Other embodiments of the invention will be apparent to those skilled in the art from a consideration of the specification and practice of the invention disclosed herein. It is intended that the specification be considered as exemplary only, with the true scope and spirit of the invention being indicated by the following claims.

What is claimed is:

1. A fluid friction clutch having a supply chamber separated from a working chamber with a connecting orifice between the supply chamber and the working chamber, the clutch comprising:

a pivotable valve lever, having a permanent magnet, for opening and closing the connecting orifice;

an electromagnetic coil that controls the pivotable valve lever; and a circuit that applies a selectively positive or negative current to the electromagnetic coil for generating a selectively alternative magnetic field that interacts with the permanent magnet and, thereby, pivots the pivotable valve lever to open and close the connecting orifice.

2. A fluid friction clutch according to claim 1, wherein the valve lever is composed of non-magnetizable material.

3. A fluid friction clutch according to claim 1, wherein the electromagnetic coil is fixed proximal to a drive shaft of the clutch.

4. A fluid friction clutch according to claim 1, wherein the electromagnetic coil is fixed in front of a clutch cover proximal to the supply chamber.

5. A fluid friction clutch according to claim 4, wherein the clutch cover covers the supply chamber in a leak-proof manner.

6. A fluid friction clutch according claim 4, wherein the clutch cover forms an outwardly open recess, in which a mounting for the electromagnetic coil is fastened.

7. A fluid friction clutch having a supply chamber separated from a working chamber with a connecting orifice between the supply chamber and the working chamber, the clutch comprising:

a pivotable valve lever, having a first permanent magnet, the valve lever pivotable between a first position and a second position with respect to the connecting orifice;

a second permanent magnet that pivots the valve lever to the first position with respect to the connecting orifice; and an electromagnetic coil that controls the pivotable valve lever such that a current applied to the electromagnetic coil pivots the valve lever to the second position with respect to the connecting orifice.

8. A fluid friction clutch according to claim 7, wherein the first position closes the connecting orifice and the second position opens the connecting orifice.

9. A fluid friction clutch having a supply chamber separated from a working chamber with a connecting orifice between the supply chamber and the working chamber, the clutch comprising:

a pivotable valve lever, having a permanent magnet, for opening and closing the connecting orifice;

an electromagnetic coil that controls the pivotable valve lever; and a circuit that applies a selectively positive or negative current to the electromagnetic coil for generating a selectively alternative magnetic field that interacts with the permanent magnet and, thereby, pivots the pivotable valve lever to open and close the connecting orifice, wherein a pivot axis of the valve lever is arranged at a maximum distance from the permanent magnet.

10. A fluid friction clutch according to claim 9, wherein the permanent magnet is arranged in a middle of the valve lever and the pivot axis is arranged at one end of valve lever.

11. A fluid friction clutch according to claim 9, wherein the permanent magnet is displaced towards a free end of the valve lever.

12. A fluid friction clutch having a supply chamber separated from a working chamber with a connecting orifice between the supply chamber and the working chamber, the clutch comprising:

a pivotable valve lever, having a permanent magnet, for opening and closing the connecting orifice;

an electromagnetic coil that controls the pivotable valve lever; and a circuit that applies a selectively positive or negative current to the electromagnetic coil for generating a selectively alternative magnetic field that interacts with the permanent magnet and, thereby, pivots the pivotable valve lever to open and close the connecting orifice, wherein the electromagnetic coil is fixed in front of a clutch cover proximal to the supply chamber, wherein the clutch cover forms an outwardly open recess, in which a mounting is fastened to the clutch cover by means of a central fastening screw, and wherein the mounting is fastened to the clutch cover by means of a central fastening screw.

13. A fluid friction clutch having a supply chamber separated from a working chamber with a connecting orifice between the supply chamber and the working chamber, the clutch comprising:

a pivotable valve lever, having a permanent magnet, for opening and closing the connecting orifice;

an electromagnetic coil that controls the pivotable valve lever; and a circuit that applies a selectively positive or negative current to the electromagnetic coil for generating a selectively alternative magnetic field that interacts with the permanent magnet and, thereby, pivots the pivotable valve lever to open and close the connecting orifice, wherein the electromagnetic coil is fixed to and rotates with the supply chamber housed within a clutch cover.

14. A fluid friction clutch having a supply chamber separated from a working chamber with a connecting orifice between the supply chamber and the working chamber, the clutch comprising:

a pivotable valve lever, having a permanent magnet, for opening and closing the connecting orifice;

an electromagnetic coil that controls the pivotable valve lever; and a circuit that applies a selectively positive or negative current to the electromagnetic coil for generating a selectively alternative magnetic field that interacts with the permanent magnet and, thereby, pivots the pivotable valve lever to open and close the connecting orifice, wherein the electromagnetic coil is fixed on a radiator of a vehicle engine, the radiator being mounted to face the clutch that drives a fan.

15. A fluid friction clutch having a supply chamber separated from a working chamber with a connecting orifice between the supply chamber and the working chamber, the clutch comprising:

a pivotable valve lever, having a first permanent magnet, the valve lever pivotable between a first position and a second position with respect to the connecting orifice;

a second permanent magnet that pivots the valve lever to the first position with respect to the connecting orifice; and an electronic coil that controls the pivotable valve lever such that a current applied to the electronic coil pivots the valve lever to the second position wit respect to the connecting orifice, wherein the first position opens the connecting orifice and the second position closes the connecting orifice.

* * * * *

UNITED STATES PATENT AND TRADEMARK OFFICE

CERTIFICATE OF CORRECTION

PATENT NO. : 5,937,983

DATED : August 17, 1999

INVENTOR(S) : Hans MARTIN et al.

It is certified that error appears in the above-identified patent and that said Letters Patent is hereby corrected as shown below:

On the title page, Item [73] Assignee, before "Magenta GmbH" please insert --BEHR GmbH & Co., Stuttgart, Germany and--.

Signed and Sealed this

Twenty-ninth Day of August, 2000

Attest:

Q. TODD DICKINSON

*Attesting Officer* *Director of Patents and Trademarks*